United States Patent Office
3,556,708
Patented Jan. 19, 1971

3,556,708
CELLULOSE DYEING WITH DICHLORO-ACRYLAMIDE QUATERNIZED REACTIVE DYES
David I. Randall, Easton, Pa., assignor to GAF Corporation, New York, N.Y., a corporation of Delaware
No Drawing. Filed Dec. 17, 1965, Ser. No. 514,666
Int. Cl. C09b 5/62
U.S. Cl. 8—39                                4 Claims

ABSTRACT OF THE DISCLOSURE

A water soluble dyestuff containing at least one quaternized fiber-reactive $\alpha,\beta$-dichloroacrylamide group of the formula —NH—CO—CCl=CH—NR$^1$R$^2$R$^3$Cl wherein R$^1$, R$^2$ and R$^3$ represent monovalent aliphatic radicals of no more than about 8 carbon atoms or at least two of R$^1$, R$^2$ and R$^3$ taken together, represent the atoms necessary to form with the depicted adjacent N atom a heterocyclic ring, and a method of dyeing therewith.

---

This invention relates to a novel fiber-coloring process and to a novel group of chromophoric compounds or dyestuffs useful in such process.

A number of dyeing processes are known in which dyeings of improved fastness properties are obtained by reaction between the dyestuff and the fiber. Among the large number of types of reactive dyes proposed for use in such processes, only a few are commercially useful. Because of the relative scarcity of such dyestuffs and/or their substantial unavailability to large sections of the dyeing trade and/or various disadvantages inherent in their properties or use with respect to procedure, cost, and/or results obtained, there exists a definite need in the industry for new and improved types of reactive dyestuffs and/or methods of dyeing therewith.

In copending applications Ser. Nos. 500,249, 500,196 and 500,214, all filed Oct. 21, 1965, there are disclosed $\alpha,\beta$-dichloroacrylamide-containing azo, anthraquinone and phthalocyanine dyestuffs which constitute new and improved reactive dyestuffs having highly advantageous properties, and the disclosures of said applications are herein incorporated by reference thereto.

It is an object of this invention to provide a novel process for coloring fibers and other articles in any desired shades of improved fastness properties. Another object of this invention is the provision of a novel group of chromophoric compounds useful in such process. Still another object of this invention is the provision of methods for making such chromophoric compounds. A further object of this invention is the provision of novel colored fibers. A still further object of this invention is the provision and colored products, which will not be subject to one or more of the above disadvantages and which depend upon a reaction between the chromophoric compound and the fibers. And another object of this invention is to provide such chromophoric compounds, processes and colored products which are still further improved relative to those disclosed and claimed in the aforementioned copending applications. Other objects and advantages will appear as the description proceeds.

The attainment of the above objects is made possible by this invention which is based upon the discovery and provision of dyestuffs containing at least one quaternized $\alpha,\beta$-dichloroacrylamide group of the following simplified form of formula:

(I)    —NH—CO—CCl=CH—NR$^1$R$^2$R$^3$Cl otherwise depicted as

—NH—CO—CCl=CH—$\overset{+}{\text{N}}$R$^1$R$^2$R$^3$Clwherein R$^1$, R$^2$ and R$^3$ represent monovalent aliphatic radicals of no more than about 8 carbon atoms or at least 2 of R$^1$, R$^2$ and R$^3$, taken together, represent the atoms necessary to form with the depicted N atom a heterocyclic ring.

Although one such group in the dyestuff is usually sufficient, dyestuffs containing a plurality, for example, up to 4, such groups may be provided in accordance with the present invention. The said group may be bonded or substituted in the dyestuff in any desired manner and/or position, the fiber-reactivity of the group being substantially independent of its position or manner of linkage in the dyestuff. In general, the group is bonded to an aryl carbocyclic ring of the dyestuff, preferably directly or optionally through an aliphatic mono or polyatomic linkage which is preferably a lower divalent alkylene group such as methylene or ethylene.

The dyestuffs of the invention may be defined as those having the formula (II)    D(—NH—CO—CCl=CH—NR$^1$R$^2$R$^3$Cl)$_n$ wherein D is a dyestuff molecule, preferably azo, anthraquinone or phthalocyanine, and $n$ has a value of at least 1, for example 1 to 4. It will be understood that the N-bonded H atom in the above-depicted group may with equivalent results be replaced by an inert radical such as lower alkyl, hydroxyalkyl, sulfatoalkyl, cyanoalkyl, and similar groups of 1 to 3 carbon atoms. It will also be understood that one or both of the depicted chlorine atoms may with equivalent results be replaced by other halogen atoms such as bromine, fluorine or iodine or other labile anions.

It has been found that the dyestuffs of the present invention as described above are readily and economically manufactured, relatively speaking, and provide further improvements relative to the dyestuffs disclosed and claimed in said copending applications with respect to solubility, facility of application, independence of pH conditions, fiber-reactivity, depth of shade, and/or fastness properties. The dyestuffs are readily applied to fibrous materials such as textiles, preferably containing a reactive or labile hydrogen atom, from an aqueous medium, preferably under acid binding conditions, by dyeing or printing for the production of dyeings and prints with improved depth of shade, brightness and/or fastness properties including resistance to wet treatments and to crocking.

In the above Formulae I and II, R$^1$, R$^2$ and R$^3$ represent, as stated, monovalent aliphatic radicals or, when taken together, the atoms necessary to form with the depicted N atom a heterocyclic ring. As examples of such aliphatic radicals, which may be substituted or unsubstituted, there may be mentioned alkenyl such as allyl, lower alkyl (1 to 6 carbon atoms) such as methyl, ethyl, normal, isomeric, and cyclic propyl through hexyl, hydroxy lower alkyl such as hydroxyethyl through hydroxyhexyl, alkoxy lower alkyl such as methoxyethyl, methoxybutyl, and ethoxyethyl, aralkyl such as benzyl and β-phenylethyl, substituted amino lower alkyl such as β-dimethylaminoethyl, gamma-dimethylaminopropyl, and gamma-diethylaminobutyl, and carboxy lower alkyl such as carboxymethyl and carboxyethyl and the like. Lower alkyl is preferred, particularly methyl.

As examples of heterocyclic rings formed by taking together at least two of $R^1$, $R^2$ and $R^3$, there may be mentioned pyrrolidine, pyrroline, piperidine, morpholine, piperazine, pyrrole, pyrrolizidine, 1-azabicyclo-(2:2:1)-heptane, quinuclidine, 1-azabicyclo-(3:2:1)-octane, 1-azabicyclo-(3:2:2)-nonane, 1-isogranatanine, conidine, 1:5-diazabicyclo-(3:3:1)-nonane, julolidine, hexahydrojulolidine, lilolidine, 1:4-diazabicyclo-(2:2:2)-octane, isoquinoline and pyridine.

In Formula II above D represents a member of any known dyestuff series, preferably a dyestuff of the azo, anthraquinone or phthalocyanine series and including all the dyestuffs disclosed as operative in the aforementioned copending applications. The azo dyestuffs may be monoazo or polyazo and may contain coordinately bound metal such as copper, chromium cobalt or the like.

The terms azo dyestuff, dyestuff of the azo series, and/or D as employed herein are intended to include as equivalents metallized and unmetallized monoazo and polyazo dyestuffs, unsubstituted or further substituted by any desired aliphatic or aromatic radicals, auxochrome substituents, solubilizing groups, and the like. Such dyestuffs, their structures, properties and methods of production are well known in the art and no claim is made thereto per se but only to such dyestuffs containing a fiber-reactive group of the Formula I above. Illustratively, any of the azo dyestuffs disclosed in U.S. 2,892,671 as suitable for the production of dyestuffs employed in the patented process containing a fiber-reactive halotriazinyl radical joined to the remainder of the dyestuff molecule through a primary or secondary amino group are suitable for use in the present invention wherein the dyestuff molecule is substituted by the above defined group of Formula I instead of the triazinylamino radical, and such patent disclosure is incorporated herein by reference thereto. As is well known, such azo dyestuffs are characterized by an azo group bridging the residue of a diazo component and an azo coupling component, and are prepared by diazotization of a diazotizable primary amine and coupling the resulting diazo component with the azo coupling component. Both components are aryl or heterocyclic radicals such as α- or β-naphthalene, benzene, thiazole, benzthiazole, pyrazolone, hydroxyquinoline, diphenyl, stilbene, diphenylamine, diphenylether or the like. The diazo component is by definition derived from a diazotizable aromatic primary amine as described, i.e. an aryl or heterocyclic compound as described containing a diazotizable primary amine radical. Azo coupling components are, as for example, see "Chemistry of Synthetic Dyes" by Venkataraman, Academic Press, 1952, Volume I beginning at page 409. Such compounds are capable of coupling by reason of an anionide or nucleophilic center in the compound at which coupling with the diazo component takes place. An important group of azo coupling components are the carbocyclic and heterocyclic compounds containing a nuclearly substituted hydroxy or amino group directing coupling in ortho or para position thereto. Another important group of azo coupling components are the heterocyclic compounds containing a reactive nuclear methylene group usually associated with an adjacent keto group (keto-methylene linkage) as in the 5-pyrazolones. Still another important group of azo coupling components are the compounds containing an aliphatic or alicyclic keto-methylene group as in the acylacetic acid arylides and esters. Examples of such coupling components include unsubstituted and substituted phenol, naphthol, toluene, cresidine, H-acid, 2-amino-5-naphthol-7-sulfonic acid, 1-phenyl-3-methyl-5-pyrazolone, acetoacetanilide, and the like. The above defined fiber reactive group of Formula I may be substituted in either the diazo component or the coupling component or both prior to or subsequent to the coupling reaction.

Similarly, the terms D, anthraquinone dyestuff, dyestuff of the anthraquinone series, and/or anthraquinone structural formulae are intended to include as equivalents the many anthraquinone intermediates, substituted and fused ring derivatives or polycyclic ketones well known in the dyeing art and disclosed for example in Chapter 7 of Lubs "Chemistry of Synthetic Dyes and Pigments" (1955) Rheinhold Publishing Corp. By way of example, the above described fiber-reactive group of the invention may be substituted in benzanthrone, 4,4'-bibenzanthrone, dibenzanthrone, anthrapyridone, anthrapyrimidine, anthrapyridazone, anthrapyrazole, anthraisothiazole, anthraquinoneanthraimide, anthraquinonenaphthocarbazole, benzanthraquinone, 1,2-pyrimidino-anthraquinone, 1-amino-4-methylamino-2-anthraquinonecarboxamide, 1,8- and 1,6-pyrenedione, anthanthrone, dibenzopyrenedione, pyranthrone, acedianthrone, 1,1'-, 1,2'- and 2,2'-dianthrimide, anthraquinonecarbazoles, 3,3'-bianthrapyrazoledione, benzanthrone-anthrapyrazolone, 1,2-anthraquinonepyrazoles, anthraquinone-oxazoles, -thiazoles and -imidazoles, anthraquinonethiophenes, anthraquinoneoxadiazoles, 3,4,9,10-perylenetetracarboxylicdiimide and N-alkyl and -aryl derivatives thereof, benzanthroneacridine, flavanthrone, anthraquinoneacridones, indanthrone, thiapyrans, thiaxanthrones, and the like.

Similarly, the terms phthalocyanine dyestuff, dyestuff of the phthalocyanine series, D and/or Pcy as employed herein are intended to include as equivalents unmetallized phthalocyanine molecules, metal phthalocyanine molecules, and such molecules bonded through any desired monoatomic or polyatomic linkage to one or more pendant aryl radicals, e.g. 1 to 4 phenyl radicals. As examples of metal phthalocyanine molecules there may be mentioned the preferred copper, in addition to cobalt, aluminum, nickel, iron, zinc, vanadium, tin, magnesium, chromium, and other metal phthalocyanines. Whether metallized or unmetallized, the phthalocyanine molecule may be nuclearly substituted by one or more lower alkyl such as methyl or ethyl, halogen such as chlorine or bromine, sulfonic, or phenyl groups. As stated, one or more of the fiber-reactive groups of Formula I above are bonded directly or optionally through a lower alkylene linkage or the like to phenylene nuclei in the fundamental phthalocyanine molecule or, when the dyestuff is a phenyl-substituted phthalocyanine molecule, to either or both the fundamental phenylene nucleus or the pendant phenyl substituent.

In dyestuffs containing pendant aryl nucleii the pendant nucleus may be bonded to the fundamental phthalocyanine nucleus through any of the known mono-, di-, or tri-atomic bridging links. Examples of such bridging links joining pendant aryl nuclei to the fundamental phthalocyanine nuclei are disclosed in U.S. Pats. 2,795,584, 2,795,853, 2,542,328, 2,479,491, etc. Illustratively, such suitable bridging links include —O—, —NR—, —NRSO$_2$—, SO$_2$NHNH—, —CH$_2$—, —C$_2$H$_4$—, —CH$_2$SO$_2$—, —CH$_2$NR—, —CH$_2$S,— —CH$_2$O—, —CO—, —S—, —CONH—, —NHCO—, and —SCH$_2$—, the actual linking atoms in such bridging links being generally C, S, O or N or any combination thereof. Methods for producing such pendant aryl-substituted phthalocyanine dyestuffs are disclosed in the prior art and will otherwise become apparent to persons skilled in the art.

The dyestuffs of this invention may be water insoluble but exhibit improved and advantageous results for most purposes when water soluble. The quaternary ammonium radical in the group of Formula I above suffices in some instances to solubilize the dyestuff, but it is preferred that the dyestuff moiety D also contain at least one anionic water solubilizing group such as sulfonic and/or carboxylic acid or salt thereof. These dyestuffs may in general be prepared by reacting a dyestuff containing an α,β-dichloroacrylamide group such as any of the dyestuffs disclosed and claimed in the aforementioned copending applications, with at least an equimolar amount of a tertiary amine of the formula $NR^1R^2R^3$ wherein $R^1$, $R^2$ and $R^3$ have the values given above. When the dyestuff contains more than one α,β-dichloroacrylamide group all or part of the additional such groups may be converted to the corresponding quaternized groups as defined above by employing correspondingly increased molecular proportions of the tertiary amine. The reaction takes place readily in water at room temperature although lower or higher temperatures may of course be employed. The reaction may be depicted by the following Equation III wherein D and $n$ have the values given above and $m$ is preferably 0 but may have a value of for example 1 to 3:

(III)

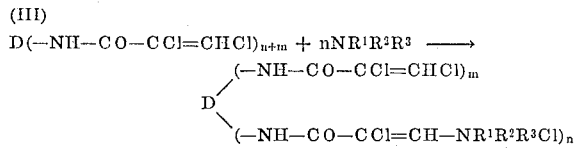

The foregoing reaction may be carried out at any desired temperature including room temperatures or below up to about 80° C. or the like, completion of the reaction often being facilitated and/or accelerated at elevated temperatures in that range. The resulting solution may be directly employed as a dye bath for coloring fibrous materials under neutral, acid or alkaline conditions depending upon the nature of the fibrous material, or the dyestuff may be readily separated from the reaction medium in known manner as by salting out, filtration, evaporation under normal or reduced pressures or any combination thereof. In the case of starting α,β-dichloroacrylamide-containing dyestuffs which are water insoluble, completion of the reaction is indicated when the dyestuff goes into solution in its desired quaternized form.

As examples of tertiary amines of the formula $NR^1R^2R^3$ which may be employed in the foregoing reaction III, there may be mentioned tri-methyl-, ethyl-, -isopropyl-, -ethanol - amines, tri - butylamine, N:N-dimethyl - N - ethylamine, dimethylbenzylamine, N:N - dimethyl - N - β - hydroxyethylamine, N:N-dimethyl-N-n-propylamine, N:N - dimethyl - N - isopropylamine, N:N-dimethyl-N-n-butylamine, N:N-dimethyl - N - β - ethoxyethylamine, 1:3-bis(N:N - dimethylamino)butane, N:N-dimethyl - N - allylamine, pyrrolizidine, 1 - azabicyclo-(2:2:1)-octane, quinuclidine, 1-azabicyclo - (3:2:1) - octane, 1-azabicyclo-(3:2:2)-nonane, 1 - iso - granatanine, conidine, 1:5 - diazabicyclo - (3:3:1) - octane, julolidine, hexahydrojulolidine, 1:4 - diazabicyclo - (2:2:2)-octane, N-methylmorpholine, pyridine, 2-, 3- or 4-methylpyridine and isoquinoline. Preferred tertiary amines are trimethylamine, 1:4-diazabicyclo-(2:2:2)-octane and pyridine.

In general, heterocyclic tertiary amines referred to above and operative herein contain 5 or 6 atoms in the heterocycle. Further, amines are preferred which are fairly water soluble and contain no more than about 10 carbon atoms.

The dyestuffs of the present invention are characterized by improved solubility, reactivity with the fibrous material, and the like. In general, they are quite different in properties from the ordinary quaternary compound in being acidic and unstable in alkaline aqueous solutions, thereby rendering them especially reactive and useful in dyeing (including printing) fibrous materials, particularly cellulose and other fibers containing reactive hydrogen atoms.

The dyestuffs of this invention are highly effective for coloring natural and synthetic fibers in any desired shades of good to excellent fastness properties by application in an aqueous medium under acid, neutral or preferably alkaline conditions at any temperature ranging from ambient temperatures to the boiling point of the medium. The dyestuff may also be formed in situ during treatment of the fibrous material by treating the material first with the α,β-dichloroacrylamide-containing dyestuff and then with the tertiary amine, or vice versa. Polyamide fibers including nylon, wool and the like may be dyed under neutral or acidic conditions, achieved for example by addition of acetic acid to the dye bath, whereas hydroxyl fibers such as cellulose are dyed under acid binding conditions.

It will be understood that as employed herein, the term "aqueous medium" is intended to include the preferred aqueous solutions of the dyestuffs in addition to dispersions or stable colloidal suspensions thereof, properly thickened in known manner when employed in a printing process. It will also be understood that while aqueous media are preferred, the water in the aqueous medium may be replaced in whole or in part by a water miscible, organic solvent such as acetone, alcohol, ether, dioxane, dimethylformamide, N - methylpyrrolidone, or the like without departing from the scope of this invention. Similarly, such medium may contain adjuvants commonly used in dyeing processes as for example solution acids such as urea and thiodiglycol, migration inhibitors such as cellulose ether, sodium chloride, sodium sulfate and other salts, wetting agents preferably of the anionic, or nonionic surface active type as produced for example by polyoxyethylenation of such reactive hydrogen containing compounds as higher molecular weight alcohols, phenols, fatty acids and the like, buffering agents such as mixtures of monosodium and disodium (or corresponding potassium) phosphates or aryl sulfonamides, and protective colloids and thickening agents for the production of printing pastes such as methyl cellulose, sodium alginate, and the like.

The aqueous medium containing the reactive dyestuffs of the invention may be applied to the fiber by immersion, jig dyeing, padding, spraying, printing or in any other desired manner. Coloration of cellulose and the like is favored by acid binding conditions preferably achieved by application of an acid binding agent to the fiber together with, prior to or subsequent to application of the dyestuff. As suitable acid binding agents, there may be mentioned generally alkali metal (sodium, potassium, lithium, etc.) hydroxide, carbonate, bicarbonate, phosphate, silicate, borate, acetate or the like, in an amount sufficient to neutralize the liberated hydrohalide in whole or in part. Such amount may range from less than 0.5% up to 10% or more based on the weight of the aqueous medium containing the reactive dyestuff. Instead of the above defined acid binding agents, a substance may be employed which liberates an acid binding agent upon subsequent subjection to elevated temperatures. An example of such a substance is sodium trichloroacetate, and the use of such a substance requires subsequent application of elevated temperatures such as by dry heat or steam.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene packaging film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 10 minutes or less to several hours or more. Optionally, the fiber is continuously padded with the fiber-treating medium containing the chromophoric compound, squeezed to, for example, a 50 to 200% liquor pickup, dried and heated to 90 to 150° C. for a hour or more to 30 seconds or less, followed by washing and rinsing. A dry heat treatment may be substituted by a steaming or the like if desired.

The dyeing process of this invention is particularly effective for dyeing and printing cellulosic fibers of natural or synthetic type such as cotton, linen, wood, paper, regenerated cellulose and the like in any desired shades of good to excellent fastness properties. As a result of the reactive dyeing process of the invention, such dyed or printed fibers are bonded and in some instances cross linked to the fiber-reactive dyestuffs of the invention through the depicted $\alpha,\beta$-dichloroacrylamide groups with liberation of tertiary amine and hydrohalide and/or the combined amine salt. A cross linking reaction is favored, leading to enhanced fastness properties, when the dyestuff contains two or more of the defined fiber-reactive groups.

By way of illustration, dyed fibers produced in accordance with the present invention may be broadly defined as having the following formula (IV)  D—NH—CO—CCl=CH-Fiber wherein "Fiber" represents the dyed fiber molecule devoid of its original reactive hydrogen atom. Thus when the fiber is cellulose, the corresponding formula is (V)  D—NH—CO—CCl=CH—O-Cellulose The corresponding cross linked dyed fibers obtained by using dyestuffs of the present invention containing two of the defined fiber-reactive groups ($n$ is 2) have the following formulae (VI)  Fiber-CH=CCl—CO—NH—D
        —NH—CO—CCl=CH-Fiber (VII)  Cellulose-O—CH=CCl—CO—NH—D
        —NH—CO—CCl=CH—O-Cellulose In addition to cellulose and its derivatives, the invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, and the like. As representative of such other fibers, there may be mentioned natural and synthetic porteinaceous fibers such as wool, silk, leather, animal hides and skins, casein, and zein, polyamides such as the 6-, and 6,6-nylons and polypyrrolidone, polyurethanes, copolymers or homopolymers containing recurring carboxylic, hydroxy or amide linear or side groups, polyvinyl alcohol, partially hydrolyzed cellulose acetate and polyvinyl acetate, polyvinyl chloride, and mixtures, copolymers and graft copolymers thereof. Mixed fabrics and fibers may be similarly treated, and concurrent use of different fiber-reactive dyestuffs of the present invention can be made for the production of novel and improved effects in any manner desired.

The fibers may be in any of the usual forms and in natural bulk, interwoven, knitted or felted form as for example in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention, and the fundamental concepts and teachings thereof.

The following examples are only illustrative of the present invention and are not to be regarded as limitative. All parts and proportions referred to herein and in the appended claims are by weight unless otherwise indicated.

EXAMPLE 1

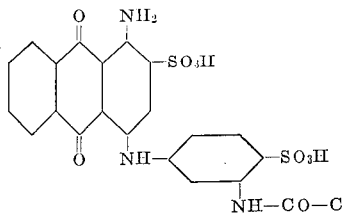

(a) 3.0 parts of the precursor dyestuff 1-amino-4(3'-$\alpha,\beta$ - dichloroacrylamido - 4' - sulfoanilino) - anthraquinone-2-sulfonic acid are stirred with 28.0 parts of water and 1.5 parts of 21% aqueous trimethylamine solution for 2 hours at room temperature. During this time the pH drops from 10.3 to 7.3. On heating for 10 minutes additionally at 40° C., the pH falls to 6.7. At this point the relatively insoluble precursor dyestuff has passed into solution in the form of the corresponding quaternized dyestuff of the above formula and is separated by salting out with 20% (weight/volume) aqueous NaCl solution, filtering off and drying.

(b) An 0.3 g. sample of the above dyestuff is dissolved in 200 cc. of water. A 10 g. skein of cotton yarn is immersed into the solution and turned for 5 minutes. 20 g. of NaCl are added, 1.0 g. of soda ash is then introduced and the dye bath warmed at 100° F. for 1.5 hours. The goods are washed with cold water and boiled off with a soap solution. The resulting dyeing has good washfastness and lightfastness and is of a stronger blue shade than the dyeing produced by the corresponding precursor dyestuff applied under identical conditions.

(c) A print paste is prepared with 3 parts of the dyestuff from (a) above, 10 parts urea, 24 parts hot water, 55 parts sodium alginate, and 2 parts sodium bicarbonate. Cotton cloth is printed with this paste, vat aged for 10 minutes, rinsed cold and then soaped for 3 minutes at 180° F. The prints have as good properties as the dyeings. The precursor dyestuff is too insoluble to be printed by this procedure dispensing with use of a dispersing agent (e.g. sodium m-nitrobenzenesulfonate).

(d) Cotton cloth is immersed in a 2% aqueous solution of soda ash and squeezed to a 100% pickup. The cloth is then printed with a print paste as described in (c) above and the printed cloth hung for 20 hours at a temperature of 20° C., rinsed, soaped, rinsed again and dried. A bright blue print with improved fastness properties is obtained.

(e) 20 parts of wool cloth are immersed in a dye solution of 0.2 part of the above dyestuff and 0.2 part of acetic acid in 1000 parts of water and the dye bath heated to 100° C. and maintained at that temperature for one hour. The dyed cloth is then removed, rinsed in water and dried. A bright blue dyeing with good fastness properties is obtained.

(f) 100 parts wool-polyacrylonitrile cloth are immersed in a solution of the above dyestuff in 4000 parts of water and the dye bath heated for one hour at 100° C. with agitation. The dyed cloth is then removed, rinsed in water and dried. A bright blue dyeing with improved properties is obtained.

(g) 100 parts of cotton cloth are immersed in a solution of one part of the above precursor in 3000 parts of water at 25° C. 150 parts of NaCl are then gradually added to the dye bath over a period of 30 minutes followed by 25 parts of soda ash. After 5 minutes under agitation, 10 parts of trimethylamine are added to the dye bath and dyeing continued for one hour at 25° C. The dyed cloth is then removed, rinsed, soaped, rinsed and dried. A bright blue dyeing with good fastness properties is obtained.

(h) 100 parts of cotton yarn are immersed in a solution of 2 parts of the above precursor in 3000 parts of water at 20° C. 150 parts of NaCl are then gradually added over 30 minutes followed by 5 parts of a 40% aqueous solution of trimethylamine and 60 parts of soda ash. Dyeing is continued for one hour at 20° C. after which the dyed yarn is removed, rinsed, soaped, rinsed and dried. A bright blue dyeing with similarly improved properties is obtained.

(i) 100 parts of silk yarn are immersed in a solution of 2.5 parts of the above dyestuff in 3000 parts of water at 20° C. and 120 parts of sodium sulfate are then gradually added over a period of 20 minutes. Dyeing is continued for 75 minutes at 25° C. and the dyed yarn then removed, immersed for 20 minutes at 85° C. in an aqueous solution containing 0.2% soda ash and 0.2% of the condensation product of nonylphenol with 8 moles of ethylene oxide, and the yarn then rinsed and dried. A bright blue dyeing with similarly improved properties is obtained.

(j) 100 parts of nylon 66 cloth are immersed in a dye bath containing 0.7 part of the precursor dye employed in (a) above, 4000 parts of water, 4 parts of the condensation product of tridecyl alcohol with 9 moles of ethylene oxide, and 2.5 parts of acetic acid and the dyeing continued for one hour at 95° C. 8 parts of soda ash and 8 parts of trimethylamine are then added and dyeing continued for 45 minutes more at 95° C. The dyed cloth is then removed, rinsed and dried. A bright blue dyeing with similarly improved properties is obtained.

EXAMPLE 2

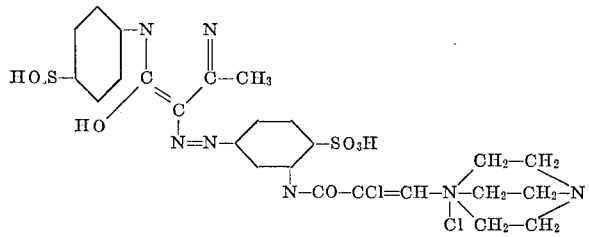

An 0.3 g. sample of the precursor dyestuff made by coupling 1-(4'-sulfophenyl)-3-methyl-5-pyrazolone with diazotized 2 - ($\alpha,\beta$-dichloroacrylamido)-4-amino-1-sulfobenzene is introduced into 200 cc. of water. To this suspension is added 4 cc. of a 2.3% (weight/volume) aqueous solution of triethylenediamine (1,4 - diazabicyclo-(2,2,2)-octane). The solution is agitated for 15 minutes at 22° C. by which time the relatively insoluble precursor dyestuff has passed into solution in the form of the corresponding quaternized dyestuff of the above formula. A 10 g. skein of cotton yarn is immersed in this solution and turned for 5 minutes. 20 g. of NaCl are added, 10 g. of soda ash is then introduced and the dye bath warmed at 100° F. for 1.5 hours. The goods are washed with cold water and boiled off with a soap solution. The resulting dyeing has good washfastness and lightfastness and has a stronger bright yellow shade than the dyeing produced by the corresponding precursor dyestuff applied under identical conditions.

Similar results are obtained when the triethylenediamine employed in the above procedure is replaced by equivalent amounts of other tertiary amines of the formula $NR^1R^2R^3$ disclosed above, including particularly trimethylamine, pyridine, N-methyl-morpholine, and N,N-dimethyl-N-benzylamine.

EXAMPLE 3

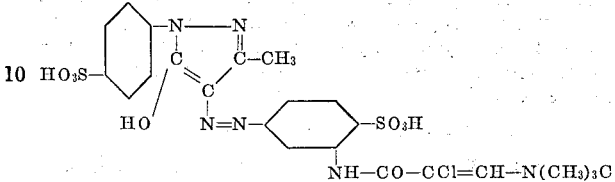

3.47 parts of the precursor dyestuff employed in Example, 2, 50 parts of water and 1.5 cc. of 25% aqueous trimethylamine solution are stirred for 3 hours at 22° C. during which time the pH changes from 10.1 to 8.0. The gelatinous suspension is heated further at 55–60° C. for 20 minutes during which time the pH drops to 6.5 and a clear solution is formed containing the quaternized dyestuff of the above formula.

The resulting solution can be employed directly for dyeing by the procedure described in Example 2, or it may be evaporated to dyness under reduced pressure to isolate the dyestuff which may then be applied to cotton by the procedures described in Example 1. Similarly improved bright yellow dyeing and printing results are obtained.

The following table is illustrative of further examples of dyestuffs included within the scope of the present invention, and the shades of the relatively stronger, washfast and lightfast dyeings produced by application of such dyestuffs to cotton by the procedures described in the preceding examples. The table lists the precursor dyestuff, the tertiary amine to be reacted therewith and the shade of the resulting dyeings and prints in accordance with this invention. In defining the precursor dyestuff, X signifies an $\alpha,\beta$-dichloroacrylamido group although corresponding N-methyl, -ethanol and the like substituted groups may be employed with substantially similar results. The table is only illustrative and it will be understood that all the $\alpha,\beta$-dichloroacrylamino-containing dyestuffs disclosed in the above mentioned copending applications and not listed in the table are also operative herein. It will also be understood that the X substituent in the precursor dyestuff may be inserted by reaction of the $\alpha,\beta$-dichloroacryloyl chloride with the corresponding amino-containing dyestuff or with the reactants employed in making such dyestuff, e.g. the diazo component, the coupling component, etc.

TABLE

| Example | Precursor dyestuff | Tertiary amine | Shade |
|---|---|---|---|
| 4 | Copper phthalocyanine tris(sulfone-N-(3'-X-4'-sulfophenyl)amide)sulfonic acid | Trimethylamine | Turquoise blue. |
| 5 | do | Triethylenediamine | Do. |
| 6 | do | Pyridine | Do. |
| 7 | do | N-methylmorpholine | Do. |
| 8 | Copper phthalocyanine tris(3'-sulfo-4'-X-phenylmethylene) | Trimethylamine | Do. |
| 9 | Copper phthalocyanine tris(methylene(N-sulfatoethyl-N-X)amine) | Triethylenediamine | Do. |
| 10 | Copper phthalocayanine tris(sulfone-N-(3'-X-4'-sulfophenyl)amide)sulfonamide sulfonic acid | do | Do. |
| 11 | 1-amino-2-(3'-X-5'-sulfoanilido)anthraquinone | Trimethylamine | Red. |
| 12 | 4,8-dihydroxy-1-X-5-aminoanthraquinone-3,7-disulfonic acid | Benzyldimethylamine | Blue. |
| 13 | 1-amino-2-sulfo-4-(3'-X)phenylsulfonamido-anthraquinone | do | Pink. |
| 14 | 1-amino-4-(3'-X-4'-carboxy)-anilino-2, 6-disulfoanthraquinone | Triethylenediamine | Blue |
| 15 | 1-amino-2-sulfo-4-(3'-methylene-X-4'-methyl)anilino-anthraquinone | N-methylmorpholine | Do. |
| 16 | 1,4-bis(3'-X-4'-sulfoanilino)anthraquinone | Trimethylamine | Olive green. |
| 17 | 2-amino-4-X-sulfobenzene → 8-acetamido-1-naphthol-3,6-disulfonic acid | do | Pink. |
| 18 | Anilino → 8-X-1-naphthol-3, 6-disulfonic acid | Triethylenediamine | Red. |
| 19 | Anilino → 3-sulfo-6-X-1-naphthol | Trimethylamine | Orange. |
| 20 | 3-sulfoaniline → 1-(3'-X)phenyl-3-methyl-5-pyrazolone | Triethylenediamine | Greenish yellow. |
| 21 | 2-amino-4-X-sulfobenzene → resorcinol | Trimethylamine | Yellow. |
| 22 | 2-amino-4-X-sulfobenzene → 2-hydroxy-3-naththoic acid | do | Red. |
| 23 | 2-amino-4-X-sulfobenzene → 2,4-dimethylacetoacetanilide | Triethylenediamine | Green yellow. |
| 24 | 2-amino-4-X-sulfobenzene → 1-Cl-8-naphthol-4, 6-disulfonic acid | Trimethylamine | Orange. |

This invention has been disclosed with respect to certain preferred embodiments and there will become obvious to persons of ordinary skill in the art various modifications and variations thereof which are intended to be included within the spirit and purview of this in-

What is claimed is:

1. A process for coloring cellulose fibrous material comprising contacting said material with an aqueous medium containing a sulfonated water soluble azo, anthraquinone or phthalocyanine dyestuff containing bonded directly or through a lower divalent alkylene group to an aryl carbocyclic ring of the dyestuff, at least one quaternized fiber-reactive α,β-dichloroacrylamide group of the formula —NH—CO—CCl=CH—NR¹R²R³Cl wherein $R^1$, $R^2$, and $R^3$ represent monovalent aliphatic radicals of no more than about 8 carbon atoms or at least two of $R^1$, $R^2$, and $R^3$, taken together, represent the atoms necessary to form with the depicted adjacent N atom a 5 or 6 membered heterocyclic ring.

2. A process as defined in claim 1 wherein said fibrous material is contacted with said aqueous medium under acid binding conditions.

3. A process as defined in claim 2 wherein said dyestuff is formed in situ by contacting said fibrous material with (1) an aqueous solution of a sulfonated water soluble azo, anthraquinone or phthalocyanine dyestuff containing at least one similarly nuclearly bonded α,β-dichloroacrylamide group of the formula —NH—CO—CCl=CHCl and with (2) a tertiary amine of the formula $NR^1R^2R^3$.

4. A process as defined in claim 2 wherein said dyestuff is formed in situ by contacting said fibrous material with an aqueous solution of a sulfonated water soluble azo, anthraquinone or phthalocyanine dyestuff containing at least one similarly nuclearly bonded α,β-dichloroacrylamide group of the formula —NH—CO—CCl=CHCl treating the contacted material with a tertiary amine of the formula $NR^1R^2R^3$, and then subjecting the treated material to acid binding conditions.

References Cited

UNITED STATES PATENTS 3,338,660   8/1967   Biedermann _____ 8—1(.214)

FOREIGN PATENTS 982,913   2/1965   Great Britain _____ 8—1(.214)

DONALD LEVY, Primary Examiner

U.S. Cl. X.R.

8—4, 12, 13, 21, 41, 42, 43, 162, 163, 85